US009876462B2

(12) United States Patent
Hudson et al.

(10) Patent No.: US 9,876,462 B2
(45) Date of Patent: Jan. 23, 2018

(54) SUPPORT SYSTEM FOR PHOTOVOLTAIC MOUNTING RAIL HAVING CYLINDRICAL BASE THAT ROTATES INTO A LOCKED POSITION

(71) Applicant: SolarCity Corporation, San Mateo, CA (US)

(72) Inventors: Tyrus Hudson, San Rafael, CA (US); Martin Seery, San Rafael, CA (US); River Broussard, San Rafael, CA (US); Malcolm Kimberley, London (GB); David Molina, Oakland, CA (US)

(73) Assignee: SOLARCITY CORPORATION, San Mateo, CA (US)

(*) Notice: Subject to any disclaimer, the term of this patent is extended or adjusted under 35 U.S.C. 154(b) by 111 days.

(21) Appl. No.: 14/986,025

(22) Filed: Dec. 31, 2015

(65) Prior Publication Data
US 2017/0063287 A1 Mar. 2, 2017

Related U.S. Application Data

(60) Provisional application No. 62/210,875, filed on Aug. 27, 2015.

(51) Int. Cl.
*H02S 20/23* (2014.01)
*F24J 2/52* (2006.01)

(52) U.S. Cl.
CPC .......... *H02S 20/23* (2014.12); *F24J 2/5245* (2013.01); *F24J 2/5232* (2013.01); *F24J 2002/529* (2013.01); *Y02E 10/47* (2013.01)

(58) Field of Classification Search
CPC ........ H02S 20/23; F24J 2/5245; F24J 2/5232; F24J 2002/529
See application file for complete search history.

(56) References Cited

U.S. PATENT DOCUMENTS

| | | | |
|---|---|---|---|
| 2,909,590 A | * | 10/1959 | Stanley .............. H01B 17/06 174/162 |
| 4,512,119 A | | 4/1985 | Willoughby |
| 6,959,520 B2 | | 11/2005 | Hartman |
| 7,690,083 B2 | | 6/2010 | Ramsauer |
| 7,797,883 B2 | | 9/2010 | Tarbell et al. |
| 7,861,485 B1 | | 1/2011 | Wentworth et al. |
| 7,866,099 B2 | | 1/2011 | Komamine et al. |
| 8,109,048 B2 | | 2/2012 | West et al. |
| 8,122,648 B1 | | 2/2012 | Liu |
| 8,146,299 B2 | | 4/2012 | Stearns et al. |
| 8,176,693 B2 | | 5/2012 | Abbott et al. |
| 8,191,321 B2 | | 6/2012 | McClellan et al. |
| 8,250,829 B2 | | 8/2012 | McPheeters et al. |
| 8,375,654 B1 | | 2/2013 | West et al. |

(Continued)

FOREIGN PATENT DOCUMENTS

| | | |
|---|---|---|
| CN | 201839228 U | 5/2011 |
| CN | 201887681 U | 6/2011 |

(Continued)

*Primary Examiner* — Anita M King
(74) *Attorney, Agent, or Firm* — Kilpatrick Townsend & Stockton LLP

(57) ABSTRACT

A support system for photovoltaic mounting rails having a cylindrical base that rotates into a locked position.

20 Claims, 13 Drawing Sheets

(56) References Cited

U.S. PATENT DOCUMENTS

| | | | |
|---|---|---|---|
| 8,647,009 B2* | 2/2014 | Kobayashi | F24J 2/5205 248/237 |
| 8,720,131 B2 | 5/2014 | Urban et al. | |
| 8,756,881 B2 | 6/2014 | West et al. | |
| 8,763,978 B2 | 7/2014 | Newman et al. | |
| 8,776,456 B1 | 7/2014 | Schrock | |
| 8,904,718 B2 | 12/2014 | Schick et al. | |
| 8,962,973 B2 | 2/2015 | Sinicco et al. | |
| 9,097,443 B2 | 8/2015 | Liu et al. | |
| 9,166,524 B2 | 10/2015 | West et al. | |
| 2005/0044807 A1 | 3/2005 | Rillie et al. | |
| 2011/0000525 A1 | 1/2011 | Wu et al. | |
| 2011/0001030 A1 | 1/2011 | Hochreiter et al. | |
| 2012/0102854 A1 | 5/2012 | Meier et al. | |
| 2012/0301661 A1 | 11/2012 | West et al. | |
| 2014/0053891 A1 | 2/2014 | West et al. | |
| 2014/0175244 A1 | 6/2014 | West et al. | |
| 2015/0075100 A1 | 3/2015 | West et al. | |
| 2015/0143760 A1 | 5/2015 | Daniels | |

FOREIGN PATENT DOCUMENTS

| | | |
|---|---|---|
| CN | 202189802 U | 4/2012 |
| CN | 202796986 U | 3/2013 |
| CN | 103348490 A | 10/2013 |
| DE | 102006025036 B4 | 4/2008 |
| DE | 102012011563 A1 | 12/2013 |
| EP | 2592365 A2 | 5/2013 |
| EP | 2721354 B1 | 12/2014 |
| FR | 2956681 A1 | 8/2011 |
| JP | 2007051439 A | 3/2007 |
| JP | 5291693 B2 | 9/2013 |
| WO | 2013119218 A1 | 8/2013 |

* cited by examiner

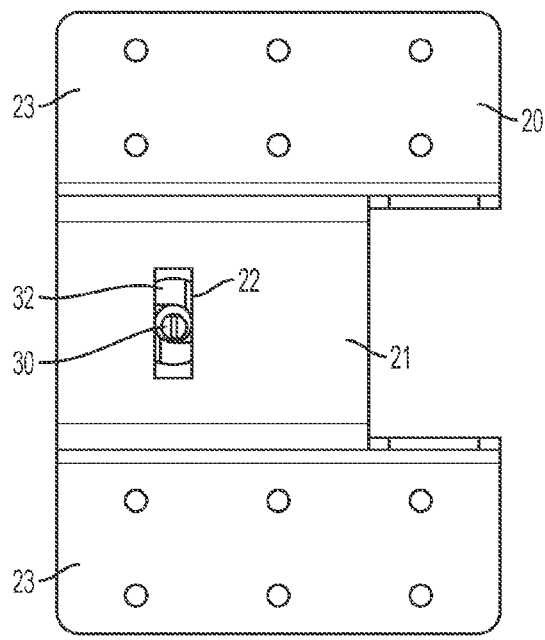 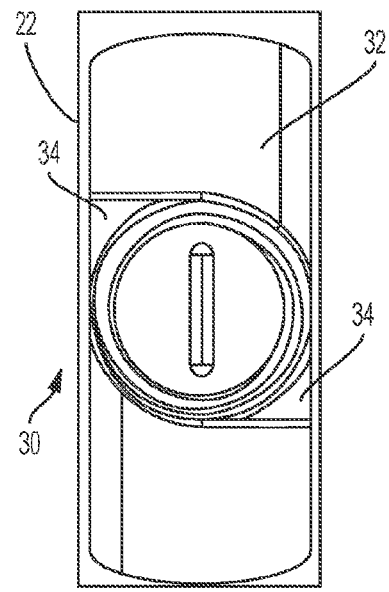
FIG. 9A  FIG. 9C
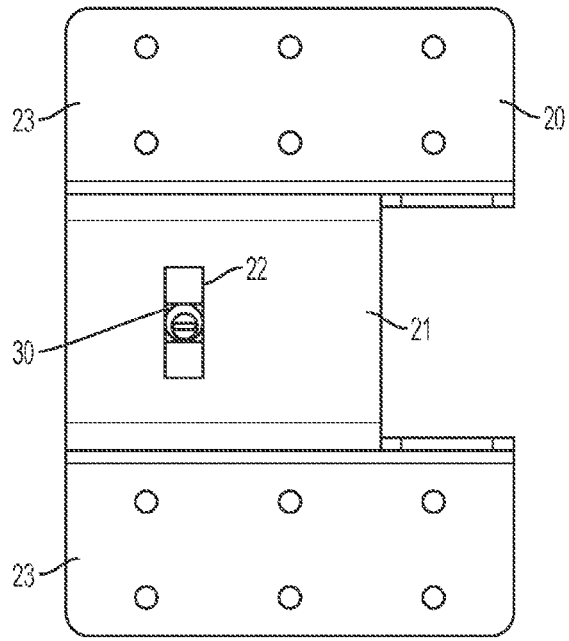 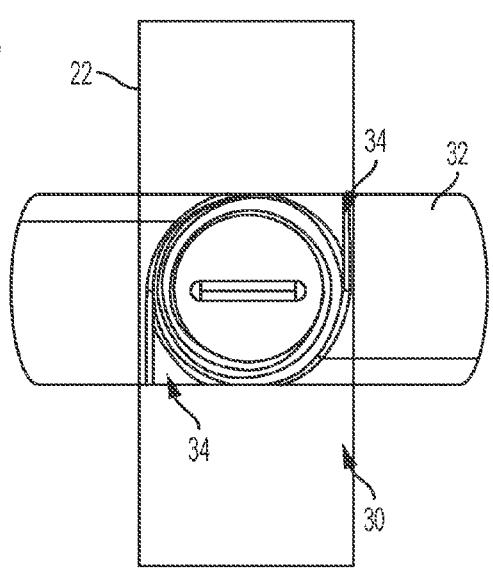
FIG. 9B  FIG. 9D

SUPPORT SYSTEM FOR PHOTOVOLTAIC MOUNTING RAIL HAVING CYLINDRICAL BASE THAT ROTATES INTO A LOCKED POSITION

CROSS-REFERENCE TO RELATED APPLICATION

This claims the benefit of priority to U.S. Provisional Application No. 62/210,875, titled "SUPPORT SYSTEM FOR PHOTOVOLTAIC MOUNTING RAIL HAVING CYLINDRICAL BASE THAT ROTATES INTO A LOCKED POSITION" and filed on Aug. 27, 2015, which is herein incorporated by reference in its entirety. This further incorporates by reference in their entirety U.S. patent application Ser. No. 14/986,033 (now granted as U.S. Pat. No. 9,673,583) titled "PHOTOVOLTAIC MOUNTING RAIL CONNECTOR WITH DROP-DOWN CONNECTION TO FIRST PHOTOVOLTAIC MODULE AND SLIDE-IN CONNECTION TO SECOND PHOTOVOLTAIC MODULE" and U.S. patent application Ser. No. 14/968,039 (currently allowed) titled "TILE AND SLATE ROOF FLASHING SYSTEMS", both applications being filed concurrently on the same day, Dec. 31, 2015, as the present application.

TECHNICAL FIELD

The present invention relates to photovoltaic mounting systems

BACKGROUND OF THE INVENTION

Photovoltaic modules generally require some form of mounting structure in order to be mounted on a roof. The traditional or older techniques for the construction of some roofs may be such that the traditional roofs are not capable of using mounting structures generally designed with modern construction techniques in mind. In some cases, older roofs may not have rafters that are positioned in a readily connectable location that can support the direct weight of additional mounting structures for solar panels, and/or are of a thickness that meets current building standards.

Accordingly, there is a need for solar panel mounting systems that can accommodate the limitations of older roofs with more particular structural needs and requirements.

BRIEF SUMMARY OF THE INVENTION

The present system provides a rapidly installable mounting system support that can be used to quickly and easily anchor a mounting rail onto a roof surface.

In various embodiments, the system provides an assembly for supporting a photovoltaic mounting rail, comprising: a mounting bracket having a slot passing therethrough; a bolt having a lower end dimensioned to pass through the slot in the mounting bracket and a locking section above the lower end, the locking section being dimensioned to rotate into a locked position within the slot; a support body receivable around the bolt, wherein rotation of the support body causes the locking section of the bolt to rotate into the locked position within the slot; and an upper mounting base positioned on top of the support body, the upper mounting base being attached to the bolt.

Preferably, the support body is cylindrical shaped such that it can be grabbed onto and easily rotated by ninety degrees by an installer when working from above. Rotation of the cylindrical shaped support body causes the bolt to rotate into a locked position in the slot in the mounting bracket at which time the bolt ceases to rotate and the bottom T-shaped end of the bolt locks below the slot in the mounting bracket. At this time, and in this locked position, the bolt holds securely onto the mounting bracket.

The bolt can pass upwardly from the mounting bracket through the cylindrical shaped support body, thereby anchoring the cylindrical shaped support body to the mounting bracket therebelow. The bolt can also be secured to an upper mounting base that in turn holds onto the photovoltaic mounting rail.

A first advantage of the present system is that it can be installed very quickly. A second advantage of the present system is that it is very intuitive and easy for an installer to use. A third advantage of the present system is that it can be locked into position by an installer using only one hand. A fourth advantage of the present system is that the cylindrical support body can be substantially hollow, making the present device very lightweight and easy to rotate.

In operation, the present system can be installed on the roof by simply fastening the mounting bracket and then rotating the cylindrical support body to tighten a single nut positioned on the upper mounting base at the top of the cylinder. Prior to tightening the first nut, the upper mounting base can be rotated such that the mounting rail attachment feature can be pointed in a preferred direction to align with the mounting rail. Next, a second nut on the upper mounting base can be tightened to set the mounting rail to a preferred height with respect to the cylindrical support body, and thereby with respect to the roof surface.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 9A is a top plan illustration of the bottom of the bolt in an unlocked position prior to locking into the mounting bracket.

FIG. 9B is a top plan illustration of the bottom of the bolt in a locked position after locking into the mounting bracket.

FIG. 9C is a detail view of FIG. 9A focusing on the unlocked positioning of the bolt and locking projections within a slot of the mounting bracket.

FIG. 9D is a detail view of FIG. 9B focusing on the locked positioning of the bolt and locking projections within a slot of the mounting bracket.

DETAILED DESCRIPTION OF THE INVENTION

Figure 1:
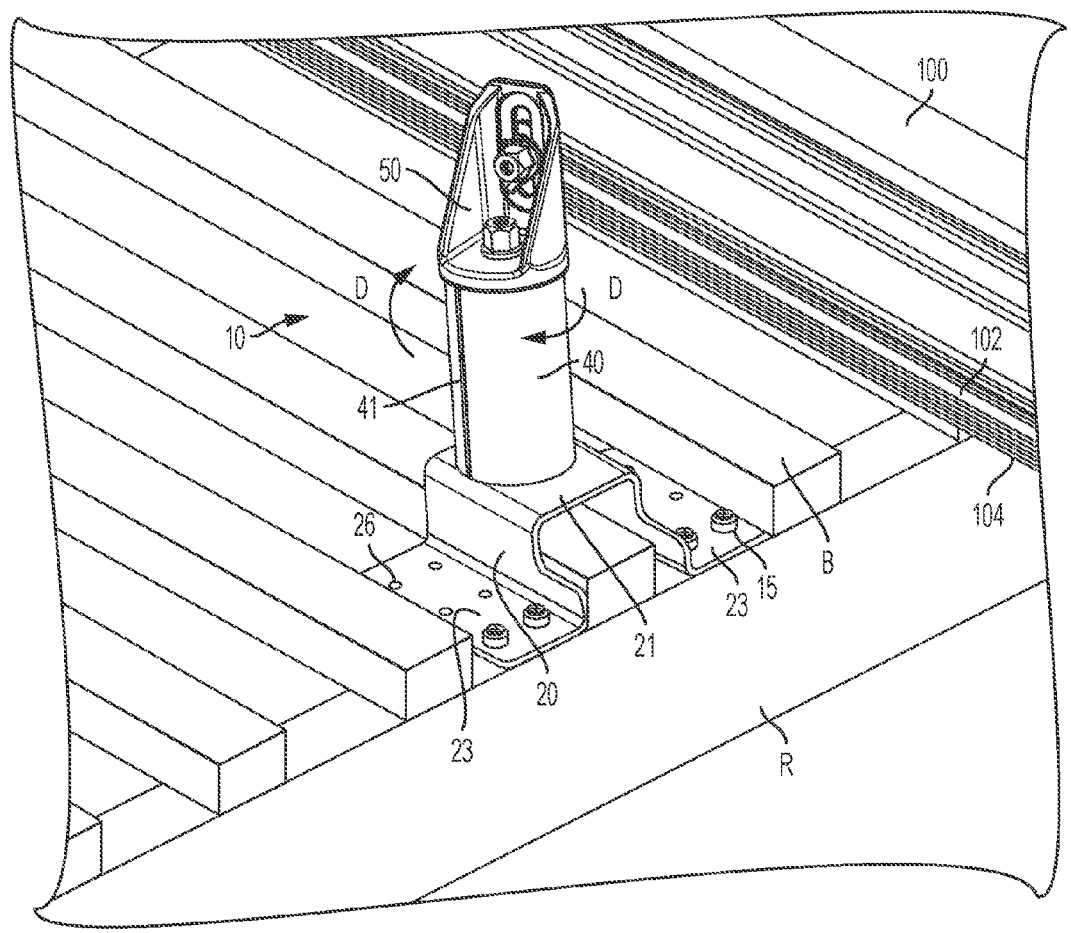
FIG. 1 is an assembled perspective view of an embodiment of the present mounting assembly.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

The present system provides for a fast and easy to install system for attaching photovoltaic mounting rails to a building roof. In one exemplary use, the present system is used on tile and slate roofs as commonly found in Europe. However, it is to be understood that the present system is not so limited and may be used on various roof types and locations.

The present system can be used to support mounting rails, configured to support solar panels as part of a photovoltaic array, such that the height of the mounting rails above the roof surface can easily be adjusted at the time of installation.

Generally, in some aspects, mounting assembly 10 can include a mounting bracket, which can be arc-bracket 20 or U-bracket 25, the mounting bracket having bracket slot 22 passing therethrough; support bolt 30 having T-shaped head 32 dimensioned to pass through bracket slot 22 in the mounting bracket, and locking projections 34 along the shaft of support bolt 30 proximate to T-shaped head 32. Support body 40 is receivable around support bolt 30, and upper mounting base 50 positioned on top of support body 40. Upper mounting base 50 can have a surface be configured to interface with a side surface of mounting rail 100.

Figure 2:
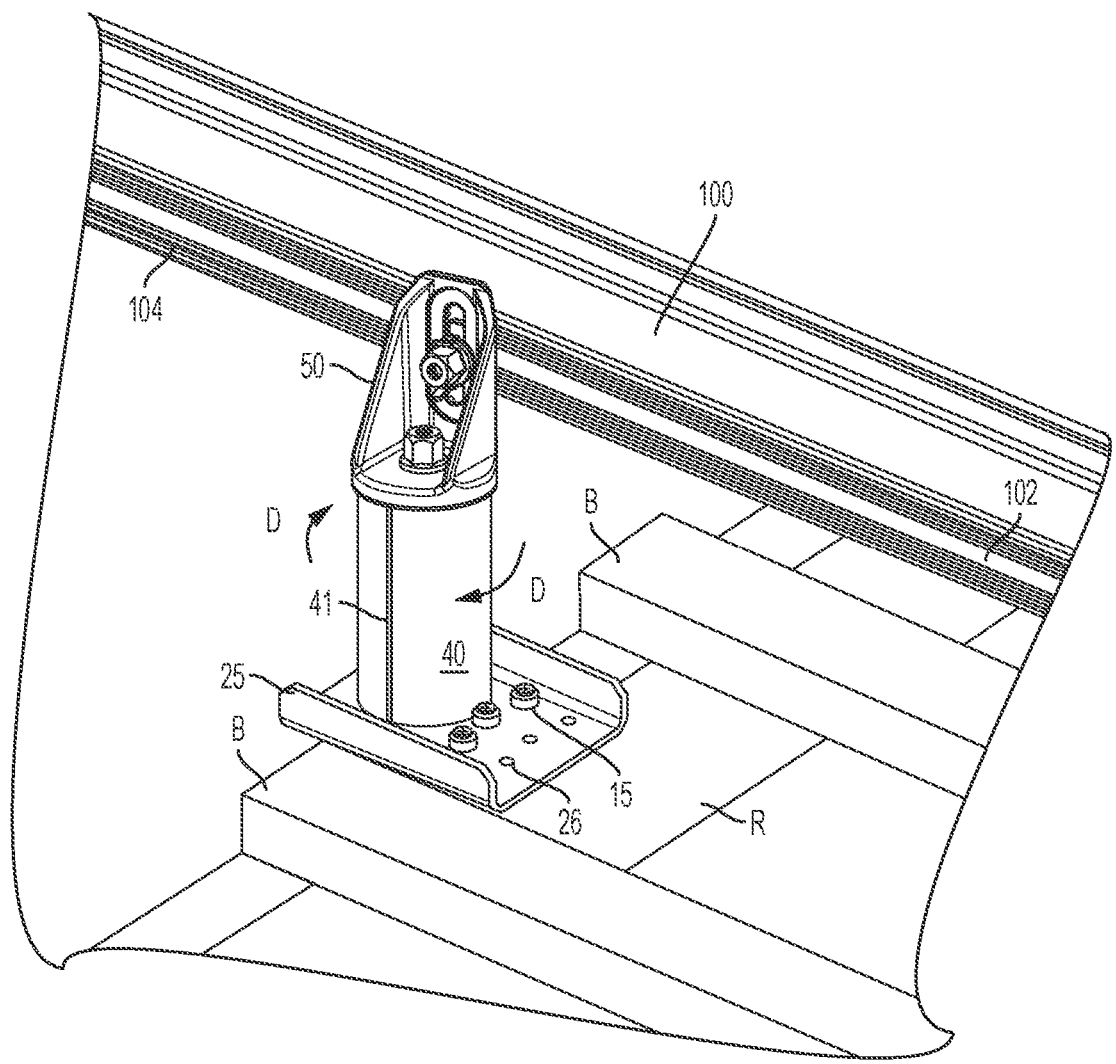
FIG. 2 is an assembled perspective view of an alternate embodiment of the present mounting assembly with a different mounting bracket.

In particular, FIG. 1 is an assembled perspective view of a first embodiment of mounting assembly 10 having arc-bracket 20 as the mounting bracket. Similarly, FIG. 2 is an assembled perspective view of a second embodiment of mounting assembly 10 having U-bracket 25 as the mounting bracket. Both the first embodiment and the second embodiment of mounting assembly 10 can be used concurrently as part of the same installation for supporting one or more mounting rails 100. Indeed, the use of ether arc-bracket 20 or U-bracket 25 for any given mounting assembly 10 can be based upon the underlying construction of a roof, having inherently unique locations for rafters R and battens B, where arc-bracket 20 or U-bracket 25 is selected for use with mounting assembly 10 to accommodate the underlying roof construction.

Support body 40 holds upper mounting base 50 a distance above the roof away from arc-bracket 20. Mounting rail 100 is connected onto upper mounting base 50. In various aspects, arc-bracket bracket 20 can be secured to a building structure such as the building rafter R as shown. Optionally, a mounting bracket may be positioned over top of a batten B (as shown with arc-bracket 20 in FIG. 1), or between building battens B (as shown with U-bracket 25 in FIG. 2). In particular, FIG. 1 and FIG. 5A show a first embodiment of arc-bracket bracket 20 suited for use with tile roofs, whereas FIG. 2 and FIG. 5B show a second embodiment of the mounting bracket, as U-bracket 25 suitable for use with slate roofs.

FIG. 1 further shows bracket holes 26 in arc-bracket 20, particularly in lowered end portions 23 of arc-bracket 20 on either side of raised center portion 21 of arc-bracket 20. As shown, arc-bracket 20 has six bracket holes 26 on each lowered end portion 23 of arc-bracket 20, paired equidistantly along the length of lowered end portion 23. In various aspects, lowered end portion 23 can have more than six bracket holes 26 or less than six bracket holes 26. In other various aspects, bracket holes 26 can be arranged on lowered end portion 23 in an alternating pattern along the length of lowered end portion 23. In further various aspects, bracket holes 26 can be arranged on lowered end portion 23 at different distances from each other along the length of lowered end portion 23. The number of bracket holes 26 and arrangement of bracket holes 26 along the length of lowered end portions 23 of arc-bracket 20 can be selected as appropriate for the underlying construction of any given roof upon which mounting rails 100 are being installed.

Figure 5A:
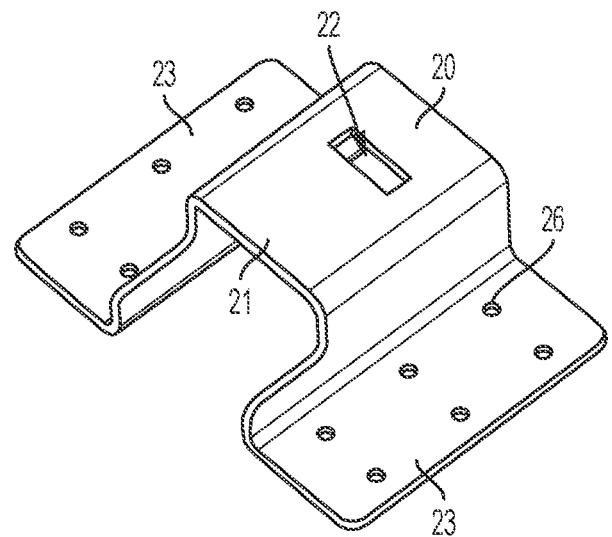
FIG. 5A is a perspective view of a first mounting bracket.
Figure 5B:
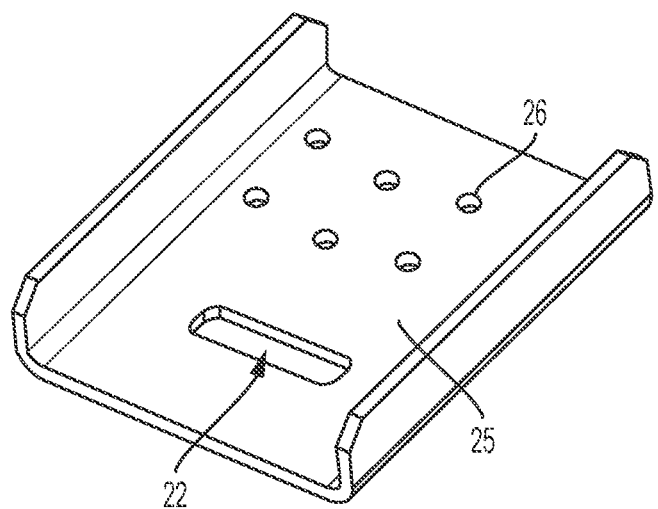
FIG. 5B is a perspective view of a second mounting bracket.

FIG. 5A provides for an isolated view of arc-bracket 20. The degree to which raised center portion 21 of arc-bracket 20 can be formed as higher than lowered end portions 23 can be based upon a known height of battens used for roofs. The height of raised center portion 21 relative to lowered end portions 23 can be selected and constructed for to accommodate various type and sizes of battens B on roofs. Bracket slot 22 is provided as passing through raised center portion 21, where the height of raised center portion 21 relative to lowered end portions 23 can also be selected to allow for at least a portion of support bolt 30 to be located between arc-bracket 20 and a roof batten B for any given mounting assembly 10 installation. In some aspects, as shown, raised center portion 21 can extend a fraction of the length of lowered end portions 23, in part allowing for access to the underside of raised center portion 21. In other aspects, raised center portion 21 can extend for as equal length as lowered end portions 23. In arc-bracket 20, bracket slot 22 being located on raised center portion 21 avoids potential physical conflicts with any rafter bolts 15 that may be located within bracket holes 26 when installed on a roof.

FIG. 2 further shows bracket holes 26 in U-bracket 25, particularly within the primary surface of U-bracket 25, where the primary surface of U-bracket 25 is configured to lay flat on a rafter R of a roof U-bracket 25 can also include raised side walls along a dimension of U-bracket 25, which can allow for ease of handling and installation. As shown, U-bracket 25 has six bracket holes 26, paired equidistantly along the width of U-bracket 25. In various aspects, U-bracket 25 can have more than six bracket holes 26 or less than six bracket holes 26. In other various aspects, bracket holes 26 can be arranged on U-bracket 25 in an alternating pattern along the width or length of U-bracket 25. In further various aspects, bracket holes 26 can be arranged on U-bracket 25 at different distances from each other along the width or length of U-bracket 25. The location of bracket holes 26 within U-bracket 25 can be configured to provide for access to an installer without conflicting with the location of bracket slot 22 or the location of support body 40 when coupled to U-bracket 25. The number of bracket holes 26 and arrangement of bracket holes 26 along the primary surface U-bracket 25 can be selected as appropriate for the underlying construction of any given roof upon which mounting rails 100 are being installed.

FIG. 5B provides for an isolated view of U-bracket 25. U-bracket 25 can have a primary surface in which bracket slot 22 and bracket holes 26 can be located. In such embodiments, bracket holes 26 should be sufficiently distant from bracket slot 22 so as to allow for support body 40 to rest over bracket slot 22 without physical conflict with any rafter bolts 15 that may be used within bracket holes 26. U-bracket 25 can further have side walls extending upward along a dimension of U-bracket 25, which can provide for structural stability and/or ease of handling during an installation.

Both arc-bracket 20 and U-bracket 25 can be formed of appropriate construction materials as known in the industry, including but not limited to: steel, aluminum, titanium, alloys, or combinations thereof. Similarly, upper mounting base 50 can be formed of appropriate construction materials as known in the industry, including but not limited to: steel, aluminum, titanium, alloys, or combinations thereof.

Both arc-bracket 20 and U-bracket 25 can be secured to a rafter R of a roof via rafter bolts 15 which pass through bracket holes 26. Rafter bolts 15 can be dimensioned to fit though bracket holes 26, as well as to further safely fit within the thickness of rafters R without risking any weakening the structure of rafters R. In other words, rafter bolts 15 can be dimensioned, and positioned through bracket holes 26, to reduce or minimize penetration into rafters R or a roof. In some aspects, rafter bolts 25 can have a shaft diameter of about three millimeters to about five millimeters (3 mm-5 mm), and in particular aspects, rafter bolts 25 can have a shaft diameter of about three-and-a-half millimeters (3.5 mm), about four millimeters (4 mm), or about four-and-a-half millimeters (4.5 mm). In other aspects, rafter bolts can be configured to secure either of arc-bracket 20 and U-bracket 25 to a batten B of a roof. In various embodiments, four (4) rafter bolts 15 can be used to fasten either of arc-bracket 20 and U-bracket 25 to a rafter R. In other embodiments, less than four, or more than four, rafter bolts 15 can be used to secure a mounting bracket to any given rafter R.

FIG. 1 and FIG. 2 also show the coupling between mounting assembly 10 and mounting rail 100. Mounting rail 100 includes side groove 102 and ridged frame surface 104 along the side of mounting rail 100 facing upper mounting base 50 of mounting assembly 10. Mounting hardware fitting within side groove 102 of mounting rail 100 and coupling with upper mounting base 50 secure mounting assembly 10 to mounting rail 100, as described in further detail herein.

Figure 3:
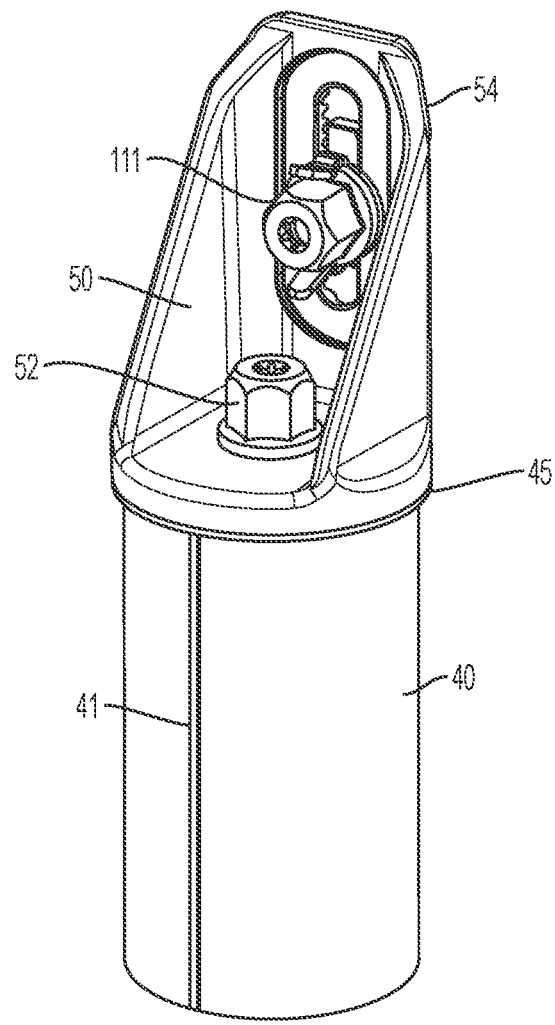
FIG. 3 is perspective view of the present mounting assembly with the mounting base removed.

FIG. 3 shows in detail support body 40 and upper mounting base 50, the combination of which can be used with either of arc-bracket 20 or U-bracket 25 as shown in FIG. 1 and FIG. 2, respectively. Support body 40 can be formed of a of construction materials as known in the industry, including but not limited to: steel, aluminum, titanium, alloys, plastics, or combinations thereof. In some aspects, support body 40 is cylindrical, thereby being amendable to rotation by hand by an installer. Support body 40 can further include timing mark 41, being a ridge or projection formed along the length of support body 40 that serves as a visual indicator to an installer of how far support body 40 needs to be rotated to secure corresponding mounting assembly 10. Gasket 45 can be positioned between support body 40 and upper mounting base 50 and can provide for a seal blocking precipitation from entering an interior portion of mounting assembly 10 or getting in between support body 40 and upper mounting base 50. In various aspects, gasket 45 can be formed of a rubber, a plastic, a polymer-impregnated textile, or the like.

In particular, sealing gasket 45 can be an optional element of mounting assembly 10, positioned between the top of support body 40 and the bottom of upper mounting base 50. Gasket 45 can ensure that water does not enter the top end of hollow cylindrical body of support body 40. As such, gasket 45 can prevent water from draining down into the hole in the roof caused by the removal of the tiles (to install of mounting bracket 20 therein). The presence of gasket 45 can also prevent support bolt 30 from falling out of the bottom of support body 40 prior to installation since gasket 45 can be tightly fit around the top end of support bolt 30 prior to support nut 52 on top of upper mounting base 50 being tightened. Support body 40 can be constructed to be substantially hollow, save for internal flanges 44 and support core 42, such that support body 40 is relatively lightweight and easy to rotate.

Figure 4:
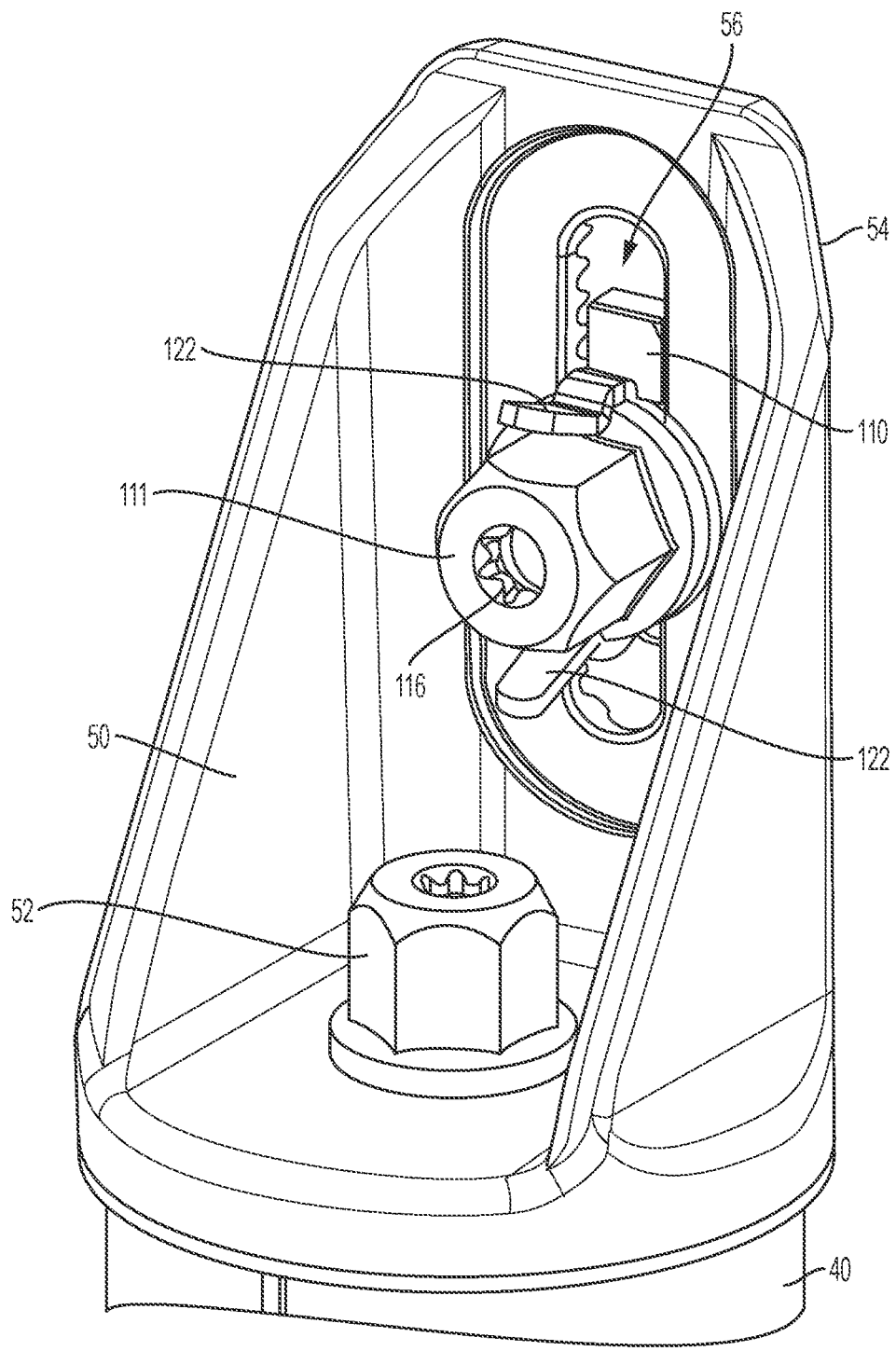
FIG. 4 is a close-up perspective view of the upper mounting base portion of the system.
Figure 7:
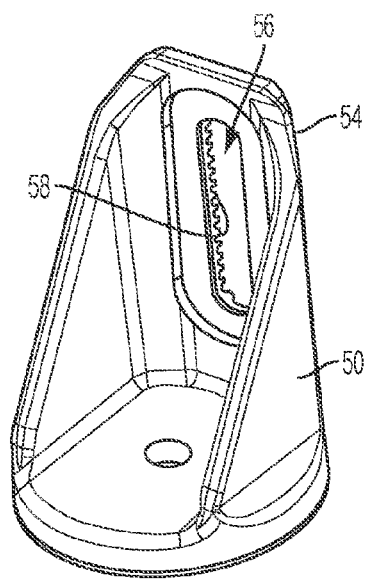
FIG. 7 is a perspective view of the upper mounting base.

Upper mounting base 50 as seen in FIG. 3, and seen in further detail in FIG. 4 and FIG. 7, having mounting hardware for coupling upper mounting base 50 to both support body 40 and mounting rail 100. Upper mounting base 50 rests on top of support body 40, and is secured to support body 40 via support nut 52 which threads onto support bolt 30 which passes through support body 40 and through a receiving hole in the matching surface of upper mounting base 50. Once upper mounting base 50 is secured to support body 40, rotation of support body 40 also rotates upper mounting base 50. Rotation of upper mounting base 50 correspondingly rotates the orientation of vertical projection 54 (alternatively referred to as an upwardly facing projection). Accordingly, by extension, mounting slot 56 (alternatively referred to as a vertical slot) and ridged surface 58 are rotated along with rotation of upper mounting base 50, and can for an installation can be rotated to face side groove 102 and ridged frame surface 104 of mounting rail 100.

In an installation, groove bolt 110 (seen in further detail in FIG. 8), partially residing within side groove 102 of mounting rail 100, can in part extend through mounting slot 56. Upper mounting base 50 and mounting rail 100 can be secured to each other by tightening of groove nut 111 along the thread of groove nut 110, pressing vertical projection 54 of upper mounting base 50 and mounting rail 100 against each other. The interface of ridged surface 58 of upper mounting base 50 and ridged frame surface 104 of mounting rail 100 is described in further detail herein.

During installation, the installer first removes roofing tiles, and then lowers one of arc-bracket 20 or U-bracket 25 into the hole caused by the tile removal. Arc-bracket 20 can then be installed on top of a roof batten B (as shown in FIG. 1) or alternately U-bracket 25 can then be installed between roof battens (as shown in FIG. 2). A base flashing (not shown) can then be installed and then the installer can place support body 40 down on top of whichever mounting bracket, arc-bracket 20 or U-bracket 25, is used, and then locks support body 40 to the mounting bracket using support bolt 30, as described further herein.

Figure 6:
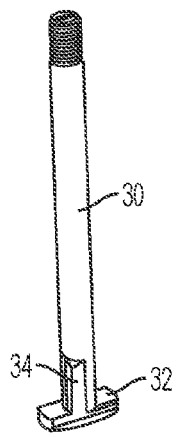
FIG. 6 is a perspective view of a bolt for securing the upper mounting base to the mounting bracket.

FIG. 6 illustrates support bolt 30. Support bolt 30 has a locking projections 34 and a T-shaped head 32. Whereas the shaft of support bolt 30 is generally cylindrical, locking projections 34 can have sharp angles, such as a square or right angles. When installed as part of mounting assembly 10, the orientation of support bolt 30 is such that T-shaped head 32 and locking projections 34 can be viewed as locking sections on the lower end of support bolt 30, and a threaded end of support bolt 30 can be viewed as at the upper end of support bolt 30. The threaded end of support bolt 30 can be configured to pass through both support body 40 and upper mounting base 50 such that support bolt 52 can coupled to support bolt 30 and thereby secure a mounting bracket, support body 40, and upper mounting base 50 to each other. Locking projections 34 can be positioned on opposing sides of the shaft of support bolt 30, proximate to T-shaped head 32. In some aspects, support bolt 30 can have one locking projection 34. Locking projection 34 of support bolt 30 can be dimensioned and positioned to rotate into a locked position within bracket slot 22, with T-shaped head 32 extending below bracket slot 22. As a result, hand rotation of support body 40 can cause support bolt 30 to rotate to a locked position such that locking projections 34 of support bolt 30 rotate into the locked position within bracket slot 22, while T-shaped head 32 of support bolt 30 will be secured underneath bracket slot 22 in mounting bracket 20, perpendicular to the longer dimension of bracket slot 22.

Figure 6A:
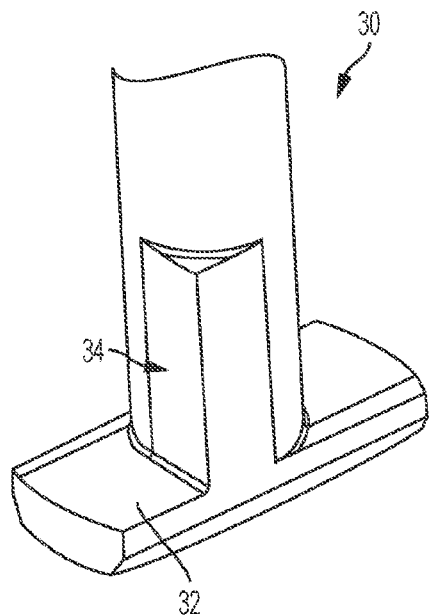
FIG. 6A is a detail view of FIG. 6 focusing on the locking projections of the bolt for securing the upper mounting base to the mounting bracket.

FIG. 6A is a detail view of FIG. 6 focusing on locking projections 34 of support bolt 30 for securing upper mounting base 50 to arc-bracket 20. As shown, locking projection 34 is a triangular feature extending from cylindrical support bolt 30 next to T-shaped head 32. Locking projections 34 extending outward can form a right angle, or a squared corner, which can stop rotation of support bolt 30 as support bolt 30 is rotated if locking projection 34 comes into contact with a hard surface (e.g. the walls of mounting bracket 20 defining bracket slot 22). Locking projections 34 can make support bolt 30 solidary to support body 40 (as described below) such that when support body 40 is rotted, support bolt 30 will rotate along with overall mounting assembly 10, such as when support bolt 30 is within bracket slot 22. In some aspects, T-shaped head 32 can be partially beveled on an upward facing surface, which can aid in fitting support bolt within bracket slot 22.

In some aspects of the present system, support bolt 30, support body 40, and upper mounting base 50 can be provided as a pre-assembled unit, albeit a loosely assembled unit, to an installer for use on an array.

Figure 10A:
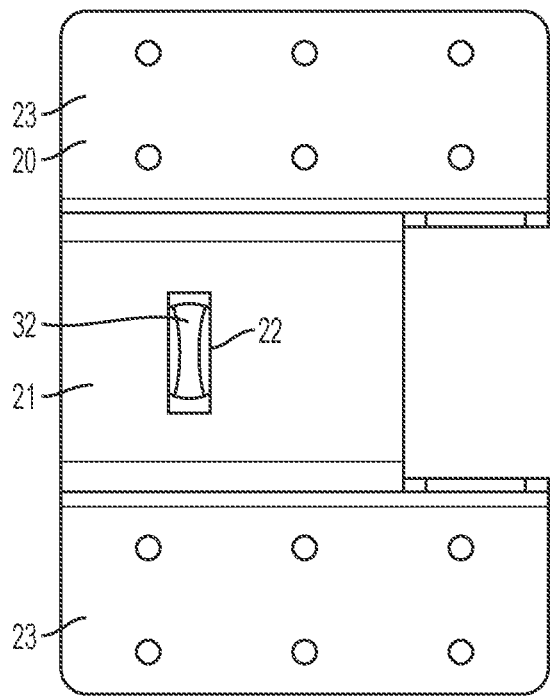
FIG. 10A is a bottom plan illustration corresponding to FIG. 9A.
Figure 10B:
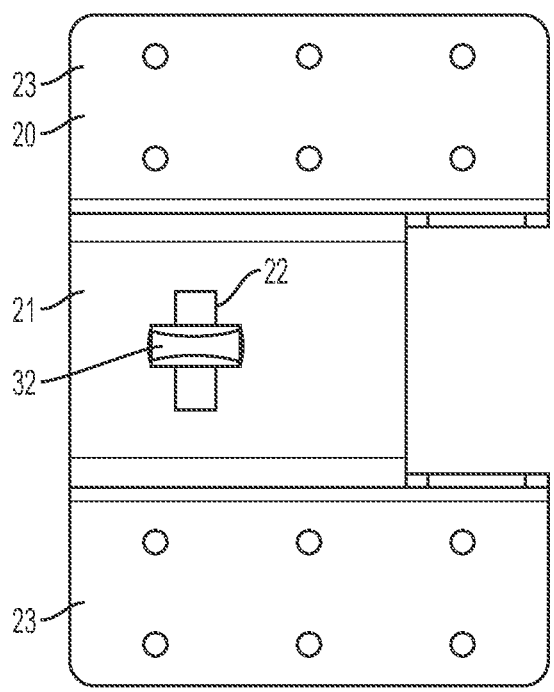
FIG. 10B is a bottom plan illustration corresponding to FIG. 9B.

FIG. 9A and FIG. 9B are top plan views of support bolt 30 and arc-bracket 20, where FIG. 9A shows support bolt 30 oriented to pass through bracket slot 22 and where FIG. 9B shows support bolt 30 oriented perpendicular to bracket slot 22 such that T-shaped head 32 will not allow support bolt 30 to be pulled up through bracket slot 22. FIG. 9C is a detail view of FIG. 9A focusing on the unlocked positioning of support bolt 30 and locking projections 34 within bracket slot 22 of arc-bracket 20. FIG. 9D is a detail view of FIG. 9B focusing on the locked positioning of support bolt 30 and locking projections 34 within bracket slot 22 of arc-bracket 20. Similarly, FIG. 10A and FIG. 10B are bottom plan views of support bolt 30 and arc-bracket 20, where FIG. 10A shows support bolt 30 oriented to pass through bracket slot 22 and where FIG. 10B shows support bolt 30 oriented perpendicular to bracket slot 22.

In other words, support bolt 30 passes through the center of support body 40. FIG. 9A to FIG. 10B illustrate how rotation of support bolt 30 by ninety degrees (90°) locks T-shaped head 32 of support bolt 30 to mounting bracket 20, as follows. First, as shown in FIG. 9A, FIG. 9C, and FIG. 10A, T-shaped head 32, as the bottom end of support bolt 30, can be positioned to extend down below bracket slot 22. Thus, FIG. 9A, FIG. 9C, and FIG. 10A show support bolt 30 in the unlocked position. However, after the installer then turns support bolt 30 by ninety degrees (90°) to the position shown in FIG. 9B, FIG. 9D, and FIG. 10B, the T-shaped head 32 of support bolt 30 will be in a locked position below bracket slot 22 (this is most clearly seen in FIG. 10B). Locking projections 34 can be positioned along the length of support bolt 30 such that when support bolt 30 is rotated as seen in FIG. 9B, FIG. 9D, and FIG. 10B, with T-shaped head 32 perpendicular to bracket slot 22, locking projections 34 can physically and/or frictionally interface with the sides of bracket slot 22. Accordingly, locking projections 34, by interfacing with the sides of bracket slot 22, can also prevent over-rotation of support bolt 30 (and by extension, over-rotation of a coupled support body 40 and overall mounting assembly 10) past ninety degrees (90°).

As seen detail in FIG. 9C, T-shaped head 32 of support bolt 30 can pass through bracket slot 22 when oriented parallel to each other. Locking projections 34 can be shaped to share a side surface with T-shaped head 32 such that locking projections 34 can also in part pass through bracket slot 22. Subsequently, as seen in detail in FIG. 9D, support bolt 30 (as viewed from above), once T-shaped head 32 has passed through bracket slot 22 (and therefore on the underside of arc-bracket 20) can be rotated in a clockwise direction. Rotation of support bolt 30 can be stopped after ninety degrees (90°) of rotation due to locking projections 34 abutting up against walls of bracket slot 22. Thus, T-shaped head 32 is set in a position that can lock the movement of support bolt 30 (and by extension of mounting assembly 10) in the Z-direction.

It can be understood that the progression of support bolt 30 from an unlocked position to a locked position as shown in relation to arc-bracket 20 in FIG. 9A to FIG. 10B is equally applicable to U-bracket 25, or to any bracket slot 22 for other such mounting brackets.

Figure 11A:
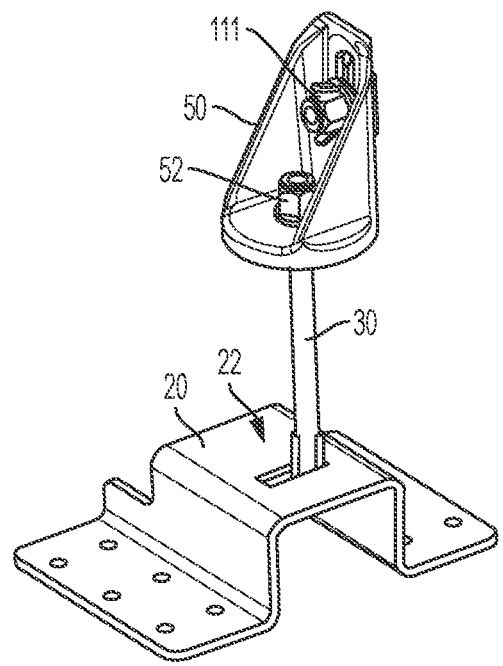
FIG. 11A illustrates Y-direction adjustment of the bolt in the slot on the mounting bracket.
Figure 11B:
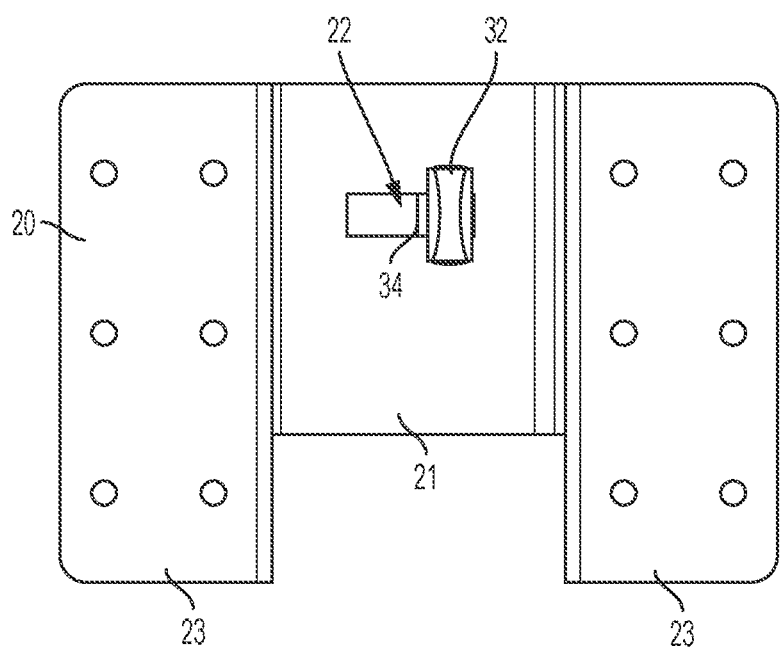
FIG. 11B is a bottom plan view corresponding to FIG. 11A.

FIG. 11A and FIG. 11B show an additional advantage of the system in that the T-shaped head 32 of support bolt 30 can optionally be slipped side-to-side to a desired position below bracket slot 22 (with locking portion 34 positionable back and forth within bracket slot 22). This feature permits the installer to move support body 40 assembly back and forth perpendicular to mounting rail 100 (which can be considered in the Y-direction relative to mounting rail 100) to better position attachment of mounting assembly 10, particularly vertical projection 54, to mounting rail 100. As shown in FIG. 11A and FIG. 11B, mounting assembly 10 (shown without support body 40) can be positioned such that vertical projection 54 of upper support base 50 is positioned within bracket slot 22 as close to mounting rail 100 (not shown) as possible, e.g. to the far right of bracket slot 22. Conversely, mounting assembly 10 can be positioned such that vertical projection 54 of upper support base 50 is positioned within bracket slot 22 as far from mounting rail 100 as possible, e.g. to the far left of bracket slot 22.

As can be seen by the alternative positioning of support bolt 30 within bracket slot 22 in FIG. 11A and FIG. 11B, support bolt 30 can be understood to have some "play" or positional flexibility that provides for minor or fine adjustment of mounting assembly 10 relative to mounting rail 100, thereby allowing for precise mounting and support of mounting rails 100 relative to rafters R of a roof. In some aspects, support bolt 30 can have about twenty-five millimeters (~25 mm) of positional flexibility along the length of bracket slot 22. In some aspects, support bolt 30 can have about fifteen millimeters (~15 mm) or less of positional flexibility along the width of bracket slot 22.

Figure 12A:
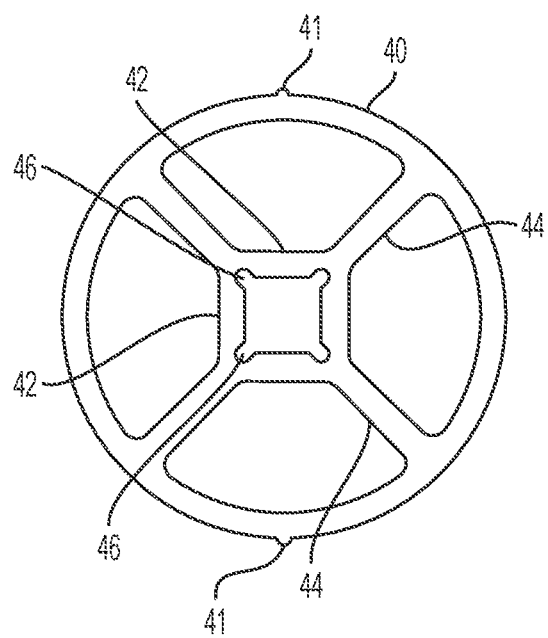
FIG. 12A is a top plan view of the support body.
Figure 12B:
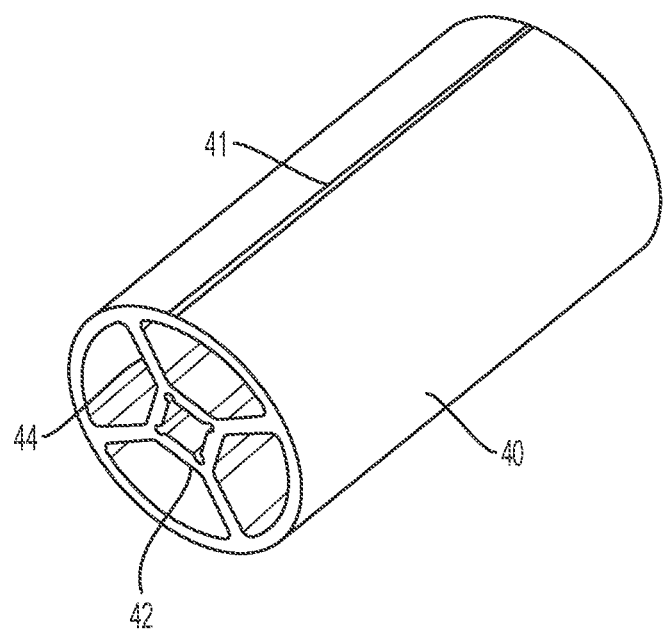
FIG. 12B is a perspective view of the support body.

FIG. 12A and FIG. 12B show views of support body 40, including interior portions of support body 40. Support body 40 may be cylindrical, as shown. Support body 40 can have an support core 42 that is received around, or wraps around, or pushes against, support bolt 30. The interior contour of support core 42 can further include notches 46, configured to receive and couple with locking projections 34 of support bolt 30. As support bolt 30 is fit within the space defined by support core 42, locking projections 34 (on opposite sides of support bolt 30) can extend into two opposing notches 46 within support body 40. As such, support core 42 of support body 40 can also push against an upper part of locking projection 34 of support bolt 30 when support body 40 is rotated in direction D to its locked position (FIG. 1 and FIG. 2). In other words, rotational motion in direction D of support body 40 is translated to support bolt 30 through the interface of locking projections 34 within notches 46 of support core 42.

Support body 40 may have an optional timing mark 41 on its exterior surface that guides the installer to rotate support body 40 by ninety degrees (90°) with their hands (to thereby ensure that T-shaped head 32 of support bolt 30 will be rotated to the installed position shown in FIG. 10B). Optional timing mark 41 can be put on the exterior surface of support body 40 at a location corresponding to the T-shaped bottom end 32 of support bolt 30. Thus, the installer can know that support bolt 30 is in a locked position because timing mark 41 will be positioned at a location at the farthest distance away from mounting rail 50.

As can be seen, support body 40 can be substantially hollow, and thus very lightweight and easy to turn. Internal flanges 44 can extend inwardly from the outside of the support body and support core 42 can wrap around support bolt 30. Support core 42 can be further articulated to accommodate locking projections 34 of support bolt 30 such that support bolt 30 will not be over-rotated within support body 40 past a locking configuration when rotating mounting assembly 10 into an operable position.

As noted above, the upper end of support bolt 30 can be used to secure upper mounting base 50 onto the top of support body 40. Specifically, support nut 52 on upper mounting base 50 can be tightened onto support bolt 30 to hold the assembly together. After support body 40 has been rotated ninety degrees (90°) into its locked position, support nut 52 can be tightened to secure upper mounting base 50 in a preferred orientation (in rotational direction D) with respect to mounting rail 100. In other words, once support body 40 is secured to a mounting bracket, upper mounting base 50 can be further rotated and adjusted to optimally face mounting rail 100, and subsequently secured into a given position with support nut 52. As a result, the angle of mounting rail 100 with respect to the vertical axis passing through support bolt 30 can be set as desired for any given positioning of mounting assembly 10 relative to mounting rail 100. An advantage of having upper mounting base 50 be rotatable on top of cylindrically shaped support body 40 is that its vertical projection 54 can be rotated to the most desirable position to align with the preferred direction of mounting rail 100.

As noted above in FIG. 1, arc-bracket 20 is optionally dimensioned to wrap over the top of a roof batten B and be connected directly to rafter R. Arc-bracket 20 can have a raised center portion 21 and two lowered end portions 23 on either side. Bracket slot 22 of arc-bracket 20 preferably passes through raised center portion 21 of arc-bracket 20. As a result, when arc-bracket 20 is wrapped over a batten B, any rotational force applied by the installer to arc-bracket 20 can also be resisted by batten B pushing back against the sides of raised center portion 21 while the two lowered end portions 23 are sitting in position on either side of batten B.

Figure 8:
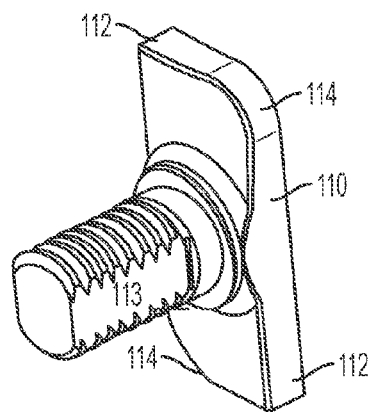
FIG. 8 is a perspective view of a bolt for securing the upper mounting base to a mounting rail.

Further details of upper mounting base 50 in FIG. 4 and FIG. 7 show vertical projection 54, which is an upwardly extending projection configured to face mounting rail 100, has mounting slot 56 therein. Interaction between upper mounting base 50 and mounting rail 100 can be further seen in FIG. 13A. Mounting rail 100 may have side groove 102 into which groove bolt 110 can be received when groove bolt is rotated in a generally horizontal orientation. Groove bolt 110 can be provided as seen in FIG. 8, having a generally T-shaped head configured to reside within side groove 102 and a threaded extension configured to pass through a vertical slot in upper mounting base 50. Groove bolt 110 can be slid within side groove 102 of mounting rail 100 to a location corresponding to for mounting assembly 10. Groove bolt 110 can be positioned such that a threaded end of groove bolt 100 extends through mounting slot 56 such that upper mounting base 50 can be fastened to mounting rail 100 by tightening the physical and/or frictional interface between mounting base 50 and mounting rail 100 via groove bolt 110. In particular, groove nut 111 can be fastened onto groove bolt 110 when groove bolt 110 passes through mounting slot 56.

Optionally, vertical projection 54 can have a ridged surface 58 facing mounting rail 100 having ridged frame surface 104. Ridged surface 58 and ridged frame surface 104 can be patterned and configured to match contours and couple with each other, in other words, the peaks and valleys forming ridges of both of ridged surface 58 and ridged frame surface 104 can fit into each other. Accordingly, groove nut 111 and groove bolt 110 can be vertically positioning at a preferred height when they are received through mounting slot 56. As such, the height of groove bolt 110 within mounting slot 56 can be set, and then when groove nut 111 is tightened onto groove bolt 110, groove bolt 110 will be held at a preferred height in mounting slot 56. In part, ridged surface 58 and ridged frame surface 104 will have a frictional interface holding upper mounting base 50 and mounting rail 100 to each other, respectively, as secured by groove bolt 110 and groove nut 111. Moreover, the interface of ridged surface 58 and ridged frame surface 104 will allow for a portion of the load of mounting rail 100 to be supported by ridged surface of upper mounting base 50. Thus, mounting rail 100 can be held at a desired position and height relative to upper mounting base 50, within a range of available ridges of upper mounting base 50.

Figure 13A:
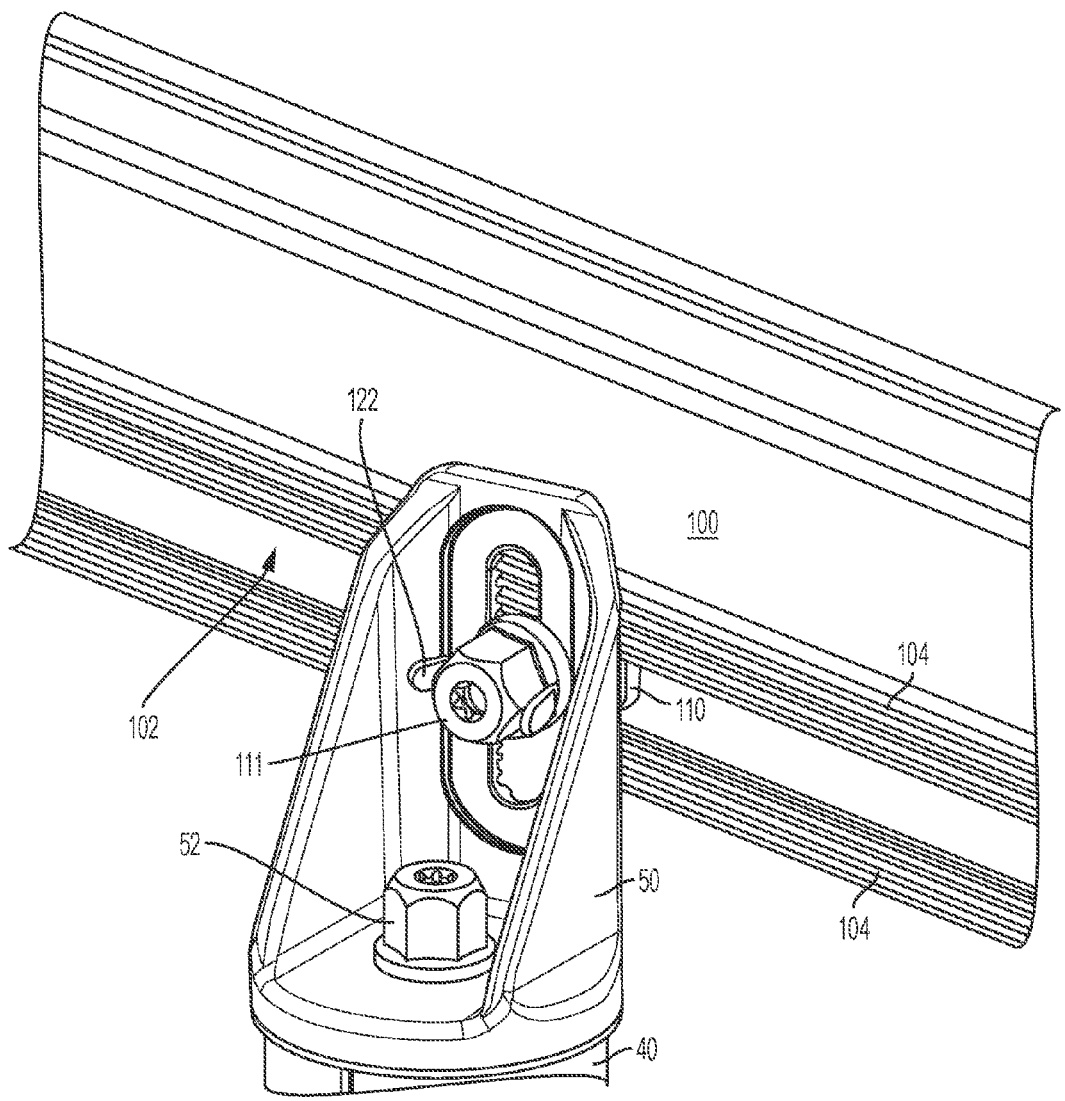
FIG. 13A is a perspective view of the upper mounting base prior to being locked into the mounting rail.
Figure 13B:
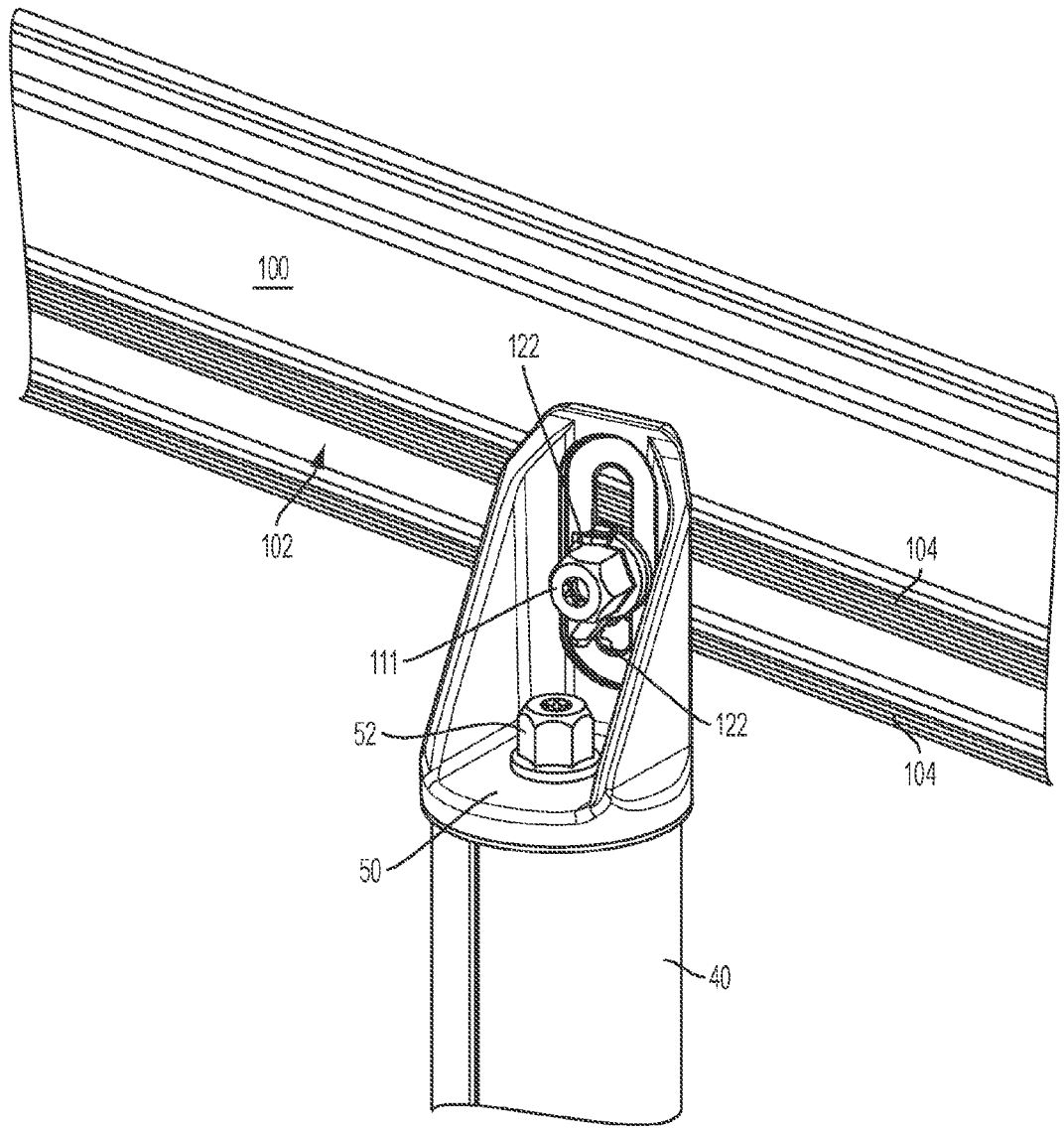
FIG. 13B is a perspective view of the upper mounting base after being locked into the mounting rail.

Groove bolt 110 can be configured to have locking corners 112 and rounded corners 114, where locking corners 112 can be received into a side groove 102 in mounting rail 100, and rotated into a locked position within groove 102. Specifically, as shown in FIG. 13A, groove bolt 110 can be rotated or oriented to a first (i.e.: unlocked) position in which locking corners 112 of groove bolt 110 can be inserted between upper and lower flanges of side groove 102 (e.g.: locking corners 112 extend horizontally parallel to side groove 102 of mounting rail 100). Next, as shown in FIG. 13B, groove bolt 110 can be rotated by ninety degrees (90°)

into a locked position behind the flanges of side groove 102 (e.g.: the locking corners 112 extend vertically perpendicular to side groove 102 of mounting rail 100). The contour of rounded corners 114 allows for groove bolt 110 to rotate within side groove 102 until the edges of locking corners 112 physically interface with internal top and bottom walls of side groove 102. The shape of locking corners 112 can prevent over rotation of groove bolt 110 past ninety degrees (90°). Thus, rotation of groove bolt 110 by ninety degrees (90°) is all that is required to secure mounting rail 100 to upper mounting base 50.

Figure 14:
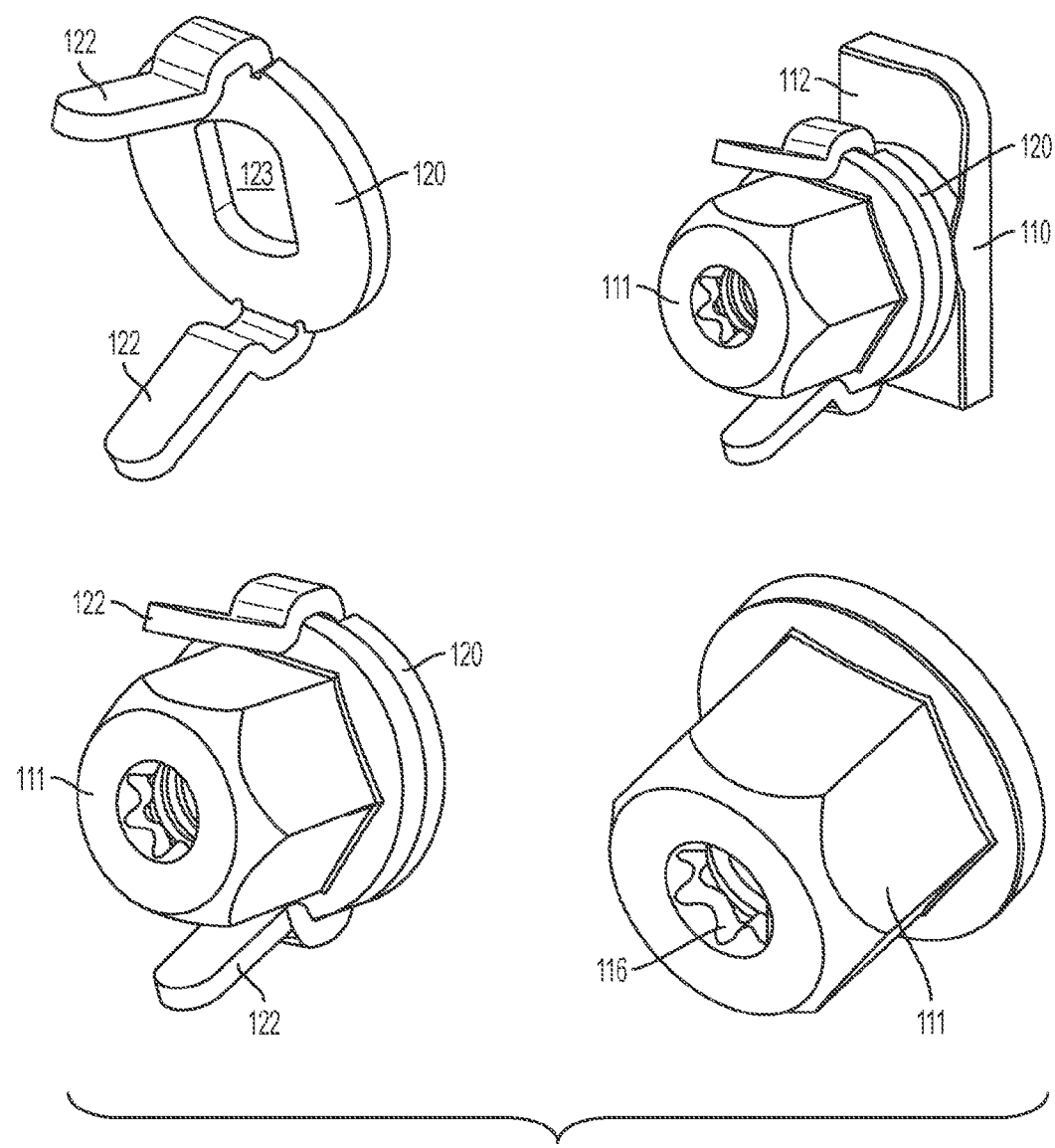
FIG. 14 shows various views of a fastening system for securing the upper mounting base to the mounting rail.

FIG. 14 shows various views of an optional alignment system that can assist an installer in ensuring that locking corner 112 of groove bolt 110 is facing in the preferred unlocked (FIG. 13A) and locked (FIG. 13B) directions in side groove 102, as follows. Retaining ring 120 (alternatively referred to as an indicating washer) having ring-arms 122 and center hole 123 can be received around groove bolt 110 prior to groove nut 111 being fastened thereto. Center hole 123 can have flat edges that mate with the flat sides 113 of groove bolt 110, as shown in FIG. 8. As such, when groove bolt 110 passes through center hole 123, retaining ring 120 will rotate together with groove bolt 110. Accordingly, ring-arms 122 will rotate together with locking corners 112 of groove bolt 110. This alignment of ring-arms 122 and groove bolt provides a visual aid/indicator for the installer, since locking corners 112 of groove bolt 110 will be positioned horizontally within side groove 102 when ring-arms 122 are positioned horizontally on groove bolt 110 (as shown in FIG. 13A). In this configuration, with ring-arms 122 being horizontal, an installer will be able to visually determine that groove bolt 110 is not in a locked position. Next, the installer can rotate groove bolt 110 such that ring-arms 122 are positioned vertically (i.e., straight up and down as shown in FIG. 13B). Accordingly, the installer will be able to visually determine that groove bolt 110 is in a locked position within side groove 102. After groove bolt 110 has been rotated into its locked position, for example by the installer grabbing onto ring-arms 122 and then rotating them into their locked position (i.e.: from the position of FIG. 13A to the position of FIG. 13B), then groove nut 111 can be tightened onto groove bolt 110 (to push against retaining ring 120), thereby securing the locking corners 112 of groove bolt 110 into a firmly locked position within side groove 102.

In some embodiments, groove nut 111 can have a torque contour 116 (alternatively referred to as a torque drive) within the center of groove nut 111 proximate to the threading of groove nut 111. Flat sides 113 of groove bolt 110 provide for a surface on which force can be applied to rotate groove bolt 110. Groove nut 111 can generally screw onto the thread of groove bolt 110 without directly contacting flat sides 113. In some aspects, however, torque contour 116 can frictionally interface with flat sides 113 such that rotation of groove nut 111, once torque contour 116 is engaged with flat sides 113, can further rotate groove bolt 110 within side groove 102. In some aspects, while groove nut 111 can screw onto groove bolt 110 in a clockwise direction, when torque contour 116 is engaged with flat sides 113 of groove bolt 110, groove nut 111 can be rotated counter-clockwise to move locking corners 112 of groove bolt 110 into a locked orientation within side groove 102. In other words, torque contour 116 of groove nut 111 allows for the application of force on flat sides 113 to rotate groove bolt 110 either into or away from a locking position or orientation. In various aspects, torque contour 116 can have a drive type having a hex shape, a torx shape, a square shape, a star shape, an octal shape, or the like. Accordingly, groove nut 111 can be used to position groove bolt 110 into a locked position in addition to securing upper mounting base 50 and mounting rail 100 to each other.

Some embodiments of the present disclosure are directed to an assembly for supporting a photovoltaic mounting rail, including: a mounting bracket having a slot passing therethrough; a support bolt having a T-shaped head configured to pass through the slot in the mounting bracket and a locking projection, the locking projection being configured to rotate into a locked position within the slot; a support body receivable around the support bolt, where rotation of the support body causes the locking section of the support bolt to rotate into the locked position within the slot; and an upper mounting base positioned on top of the support body, the upper mounting base being attached to the support bolt, and the upper mounting base being configured to interface with a side surface of a mounting rail. In some aspects, the support body can be cylindrical. In some aspects, the support body can have a support core configured to receive the support bolt. The mounting bracket can be dimensioned to wrap over a roof batten, and in some aspects, the mounting bracket can have a raised center portion and two lowered end portions, where the slot passes through the raised center portion. The upper mounting base can be rotatable on the support body. In some aspects of the assembly, the support core pushes against the locking portion of the support bolt when the support body is rotated. Further, the support bolt can be configured to rotate ninety degrees from an unlocked to a locked position. In many aspects, the support body is substantially hollow. The support body can have internal flanges extending inwardly from the support body that are configured to wrap around the support bolt. In some other aspects, the upper mounting base can be secured through the support body to the mounting bracket via a support nut screwed onto the support bolt passing through the support body. The assembly can further include a gasket positioned between the support body and the upper mounting base. In many aspects, the upper mounting base includes a vertical projection having a vertical slot or a mounting slot. In some aspects, the vertical projection can have a ridged surface for positioning a groove nut and groove bolt received through the vertical slot. In such aspects, the groove bolt passing through the slot in the vertical projection is received within a side groove in a mounting rail. The assembly, particularly the upper mounting base, can further include a retaining ring received around the groove bolt, where the retaining ring can have ring-arms that extend outward and are aligned with a T-shaped end of the groove bolt. In some aspects, the mounting bracket includes bracket holes configured to receive rafter bolts that have a shaft diameter of about four millimeters. In further aspects, the mounting bracket can include six or more paired bracket holes.

Some embodiments of the present disclosure are directed to a mounting assembly having: an arc-bracket having a bracket slot; a bolt having a lower end dimensioned to pass through the bracket slot in the mounting bracket and a locking section above the lower end, the locking section being dimensioned to rotate into a locked position within the slot; a support core within a support body, the support core dimensioned to receive the bolt, where rotation of the support body causes the locking section of the bolt to rotate into the locked position within the bracket slot; and an upper mounting base positioned on top of the support body, the upper mounting base being attached to the bolt.

Other embodiments of the present disclosure are directed to a mounting assembly having: a U-bracket having a bracket slot; a bolt having a lower end dimensioned to pass through the slot in the mounting bracket and a locking section above the lower end, the locking section being dimensioned to rotate into a locked position within the slot; a support body receivable around the bolt, where rotation of the support body causes the locking section of the bolt to rotate into the locked position within the slot; and an upper mounting base positioned on top of the support body, the upper mounting base being attached to the bolt.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, will be apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An assembly for supporting a photovoltaic mounting rail, comprising:
    a mounting bracket having a slot passing therethrough;
    a support bolt having a T-shaped head configured to pass through the slot in the mounting bracket and a locking projection, the locking projection being configured to rotate into a locked position within the slot;
    a support body receivable around the support bolt, wherein rotation of the support body causes the locking section of the support bolt to rotate into the locked position within the slot; and
    an upper mounting base positioned on top of the support body, the upper mounting base being attached to the support bolt, and the upper mounting base being configured to interface with a side surface of a mounting rail.

2. The assembly of claim 1, wherein the support body is cylindrical.

3. The assembly of claim 1, wherein the support body has a support core configured to receive the support bolt.

4. The assembly of claim 1, wherein the mounting bracket is dimensioned to wrap over a roof batten.

5. The assembly of claim 1, wherein the mounting bracket has a raised center portion and two lowered end portions, and wherein the slot passes through the raised center portion.

6. The assembly of claim 1, wherein the upper mounting base is rotatable on the support body.

7. The assembly of claim 3, wherein the support core pushes against the locking portion of the support bolt when the support body is rotated.

8. The assembly of claim 1, wherein the support bolt is configured to rotate ninety degrees from an unlocked to a locked position.

9. The assembly of claim 1, wherein the support body is substantially hollow.

10. The assembly of claim 1, wherein the support body has internal flanges extending inwardly from the support body configured to wrap around the support bolt.

11. The assembly of claim 1, wherein the upper mounting base is secured through the support body to the mounting bracket via a support nut screwed onto the support bolt passing through the support body.

12. The assembly of claim 1, further comprising a gasket positioned between the support body and the upper mounting base.

13. The assembly of claim 1, wherein the upper mounting base comprises a vertical projection having a vertical slot therein.

14. The assembly of claim 13, wherein the vertical projection has a ridged surface for positioning a groove nut and groove bolt received through the vertical slot.

15. The assembly of claim 13, wherein the groove bolt passing through the slot in the vertical projection is received into a side groove in a mounting rail.

16. The assembly of claim 13, further comprising a retaining ring received around the groove bolt, the retaining ring having ring-arms extending therefrom that are aligned with a T-shaped end of the groove bolt.

17. The assembly of claim 1, wherein the mounting bracket includes bracket holes configured to receive rafter bolts that have a shaft diameter of about four millimeters.

18. The assembly of claim 1, wherein the mounting bracket includes six or more paired bracket holes.

19. The assembly of claim 1, wherein the mounting bracket is an arc-bracket.

20. The assembly of claim 1, wherein the mounting bracket is a U-bracket.

* * * * *